United States Patent [19]

Kummer

[11] Patent Number: 4,741,287

[45] Date of Patent: May 3, 1988

[54] APPARATUS FOR REMOVING A MILKING CLUSTER, PARTICULARLY FOR A COW-SHED

[75] Inventor: Jan Kummer, Leeuwarden, Netherlands

[73] Assignee: Kummer Electronics B.V., Leeuwarden, Netherlands

[21] Appl. No.: 913,115

[22] Filed: Sep. 29, 1986

[30] Foreign Application Priority Data

Oct. 2, 1985 [NL] Netherlands ................. 8502694

[51] Int. Cl.⁴ .................................. A01J 5/00
[52] U.S. Cl. ............................ 119/14.08; 119/14.13
[58] Field of Search ............. 119/14.08, 14.1, 14.13, 119/14.01

[56] References Cited

U.S. PATENT DOCUMENTS

| | | | |
|---|---|---|---|
| 3,556,053 | 1/1971 | Padman et al. | 119/14.08 |
| 3,690,300 | 9/1972 | Tonelli | 119/14.08 |
| 4,491,085 | 1/1985 | Rubino | 119/14.1 |
| 4,586,462 | 5/1986 | Icking | 119/14.13 X |

FOREIGN PATENT DOCUMENTS 534212 6/1977 U.S.S.R. ................. 119/14.01

Primary Examiner—Robert P. Swiatek
Assistant Examiner—R. Thomas Price
Attorney, Agent, or Firm—Murray Schaffer

[57] ABSTRACT

This removal apparatus comprises a bellows-shaped hose as the lifting element, which contracts under the influence of the vacuum in the milking conduit and then constitutes a rigid element, which may easily be manipulated and displaced. Moreover the apparatus is less expensive than the known removal apparatus.

10 Claims, 4 Drawing Sheets

APPARATUS FOR REMOVING A MILKING CLUSTER, PARTICULARLY FOR A COW-SHED

BACKGROUND OF THE INVENTION

The present invention relates to apparatus for detachably applying the milking cluster, of an automatic milking machine, to a cow.

The known apparatus, as shown in European patent application No. 0097395, comprises a vertically movable lifting element to which the milking cluster is connected by a lifting cord. The lifting element is connected by a vacuum hose to a valve which is connected to the vacuum conduit of the milking machine and which is itself controlled by an electronic control circuit. The valve is adapted to be switched by the control circuit to a position in which is exposes the lifting element to vacuum, whereby the milking cluster is caused to be lifted to a rest or storage position above the ground, while it simultaneously releases the cow's udder from the milking cluster.

However, small farms employ simple cow sheds for which such complex cluster removal apparatus is rather expensive since the known machines require a synthetic resin cylinder and piston and the seals therefor, as well as a screw cap on the cylinder end, where the electronic control unit is normally provided.

OBJECTS AND SUMMARY OF THE INVENTION

The invention aims at reducing the cost of the known removal apparatus while retaining its correct operation.

This is achieved according to the invention in that the lifting element is an air tight flexible elongated element, which is longitudinally elastic, being retractable and expansible dependent on the air pressure prevailing therein, but which is substantially undeformable in the transverse direction.

Preferably the lifting element is a hose-shaped bellows.

Thus, the piston with seals as well as the other mentioned parts are eliminated. The element is simple and light in weight. In the removal condition, with the milking cluster suspended, the lifting element may be retracted to substantially one-third of the length it has in the attached condition and in the retracted condition is substantially rigid. Consequently, the apparatus may be more easily displaced from one cow position to an other in the shed than the heavier and longer cylinder of the known apparatus.

When in the attached or use condition the bellows are elongated and rather limp so that it constitutes, so to speak, merely a prolongation of the lifting cord which may then be connected to the lower end of the lifting element rather than to its upper end as in the known apparatus. In the known apparatus the cord must extend from the upper end of the cylinder to the cluster in order to prevent dragging of the milking cluster along the dirty ground, as the milking cluster is released from the udder. Further, the conventional pulley used in the known apparatus for guiding the lifting cord downwardly and the friction produced thereby are eliminated. Dragging along the gound of milking clusters during removal, particularly occurring with removal apparatus having a rigid cylinder, is obviated.

In a practical embodiment, the lifting element according to the invention, comprises a hose manufactured from textile material, coated with rubber or an elastomeric resin, and in which a rigid, e.g. metallic ring is located between each two successive undulations of the bellows. Preferably the rings are constituted by a coil spring, continuing through the length of the bellows.

With removal apparatus of the type to which the invention relates, a three-way valve may be used as the vacuum valve. This type of valve communicates in one position with the vacuum conduit and in its other position with ambient air, allowing the base to be manually manipulated. However, another possibility is to use a two-way valve, which is available at about half the price of the three-way valve, which in one position communicates with the vacuum conduit and in its other position only closes communication with the vacuum conduit but does not establish communication with ambient air. In the latter case, a simple spring biassed valve should be provided on the lower end of the cylinder or in the connection between the valve and the cylinder, the spring biased valve being adapted to be opened by means of a cord, when it is desired to apply the milking cluster to the udder.

It is advantageous to use, in the removal apparatus according to the invention, a two-way vacuum valve and providing a manually operable air supply valve at the lower end of the lifting element. Thus, while the lifting element may be shortened in the removal condition to about one-third of its length, a person will be able to operate the pull valve without bending down so as to simultaneously take along with the milking cluster the lower end of the lifting element to install it on the cow. This permits easier application of the cluster.

It is also advantageous to connect the lifting cord to the lifting element by means of a resilient plug, which is removably inserted into a central aperture in the bottom of the lifting element. Since a cow could damage the apparatus by unexpected movements or by stepping with a hind leg on the lifting cord, the cord usually is connected to the lifting element through a small spring clamp, which opens when it is overloaded. When an overload occurs, the connection is broken in that the plug is pulled from the lifting element. As a result, the lifting element will not lift even when the vacuum valve is operated with the intention to remove the milking cluster. In that case the farmer immediately observes from the length of the lifting element that something is wrong. The connection between the lifting cord and the lifting element may be easily reinstated by pressing the plug, which e.g. may have a pear-shape, back into the bottom aperture.

In so called walk-in stables, in which the cows are arranged during milking alongside a pit in the stable, it may be troublesome if due to inadvertently stepping on the lifting cord, a vacuum is established in the lifting element and its lower end moves upwardly as the hose contracts. The operator namely stands on the bottom of the pit and since the vacuum conduit is at a level of about 2 meters above the edge of the pit, he merely climbs out of the pit in order to be able to reconnect the lifting cord to the lower end of the hose.

An advantageous method for preventing damage to the hose when the cow steps on the lifting cord and yet, contrary to the use of the spring clamp, restrict the force acting on the hose to an accurately predetermined maximum, is that of connecting the lifting cord to the lifting element by means of a soft iron plate and a permanent magnetic plate, one of which being connected to the lifting cord and the other of which being secured to the lower end of the lifting element. Two oppositely polarized permanent magnetic plates may also be used.

It is not necessary to manufacture the hose from unnecessarily thick material whereby the flexibility in the applied position of the milking cluster and thereby the inclination angle of the hose with the vertical direction would diminish (whereby the cluster could drag along the ground). The force produced by a cow is so great that even with thick hose material, the hose could be damaged.

The invention will be further illustrated below with reference to the drawing in which an embodiment of the removal apparatus according to the invention, given as an example only, is shown.

DESCRIPTION OF THE INVENTION

Figure 1:
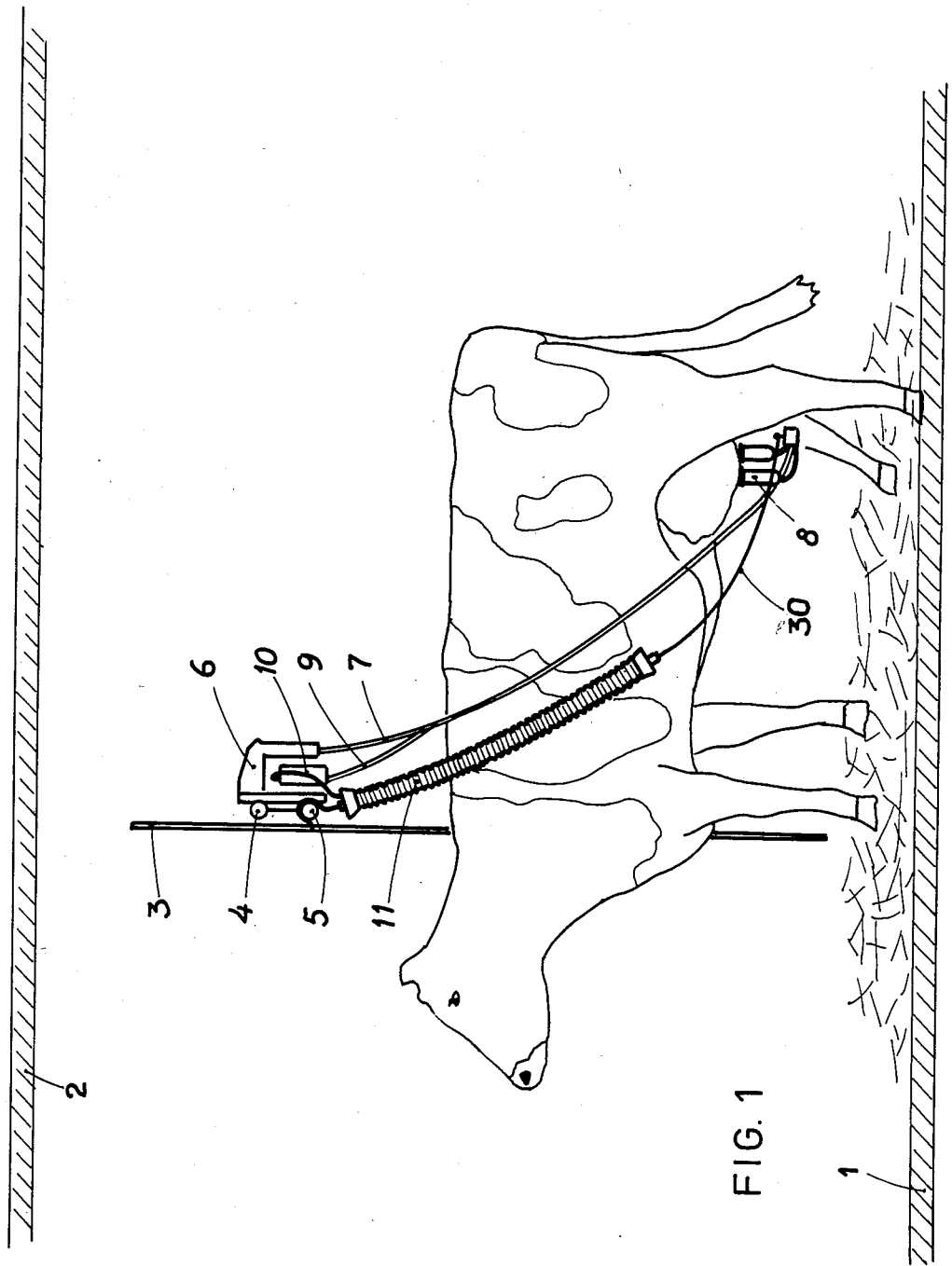
FIG. 1 is a side elevational view showing the removal apparatus with the milking cluster applied to a cow.

A cow-shed located between the floor 1 and the roof 2 of a stable is shown. Between each shed, an upright 3 is provided on which a milk conduit 4 and a vacuum conduit 5 are secured in substantially horizontal position. Attached to the conduits 4 and 5 between each two adjacent cow positions is a handgrip 6, known per se. The handgrip 6 is connected to the conduit by means of a snap plug connection insertable within apertures provided in the conduits 4 and 5, so that milk conduit 4 communicates with a milk hose 7, the other end of which is connected to a milking cluster 8, so that the vacuum conduit 5 communicates with a vacuum hose 9, the other end of which is also connected with the milking cluster 8.

Mounted on the handgrip 6 is a housing 20 in which is contained an electrically operated valve V such as the aforementioned three-way or two-way valve. The valve V controls the flow of air or vacuum from vacuum conduit 5, via conduits 10′ and 10 respectively, to an adjacent lifting element 11 which is hung by a hanger on the vacuum conduit 5. Suitable electrical connections, plugs, etc. are provided (although not shown) for operation of the valve V.

Figure 2:
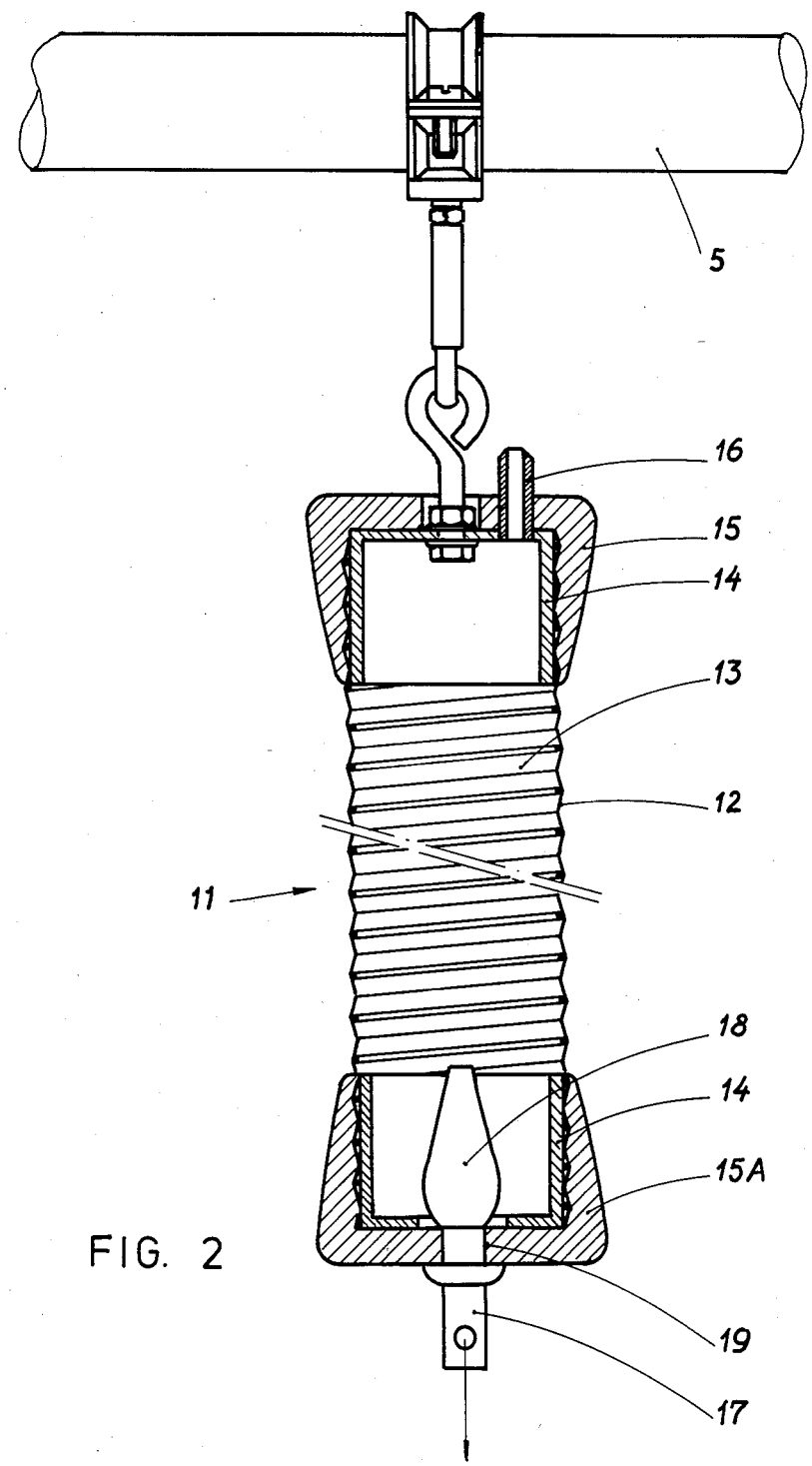
FIG. 2 is a longitudinal section through the lifting element.

The lifting element 11, as shown in detail in FIG. 2, comprises an elongated bellows element 12 in the shape of a bellows. This bellows-shaped element may be a thin-walled tube or hose which may be woven from synthetic material threads and covered with or impregnated by a rubber or other elastomeric material. The tube is reinforced interiorly with a thin metallic coil spring 13, having a diameter such that it engages the inner surface of the tube. The open tube ends are each clamped around a cup shaped end piece 14 over which an elastic end caps 15 and 15A of rubber or plastic are sealed. Thereby the bellows ends of the hose or tube are sealed and being thin-walled it can easily be compressed in the longitudinal direction to a condition in which the turns of the coil spring 13 are in mutual engagement (see FIG. 3 to the right).

A fitting 16 is provided in the upper end of the bellows element 12 being adapted to be connected to the vacuum hose 10. An eye-piece 17 is provided at the lower end of the bellows element 12 to which one end of the lifting cord 30 is connected. The other end of the lifting cord 30 is connected to the milking cluster 8. In the embodiment shown, the eye-piece 17 is part of a pear-shaped elastic plug 18, which is inserted through a central bottom aperture 19 of the lower end cap 15A.

Figure 3:
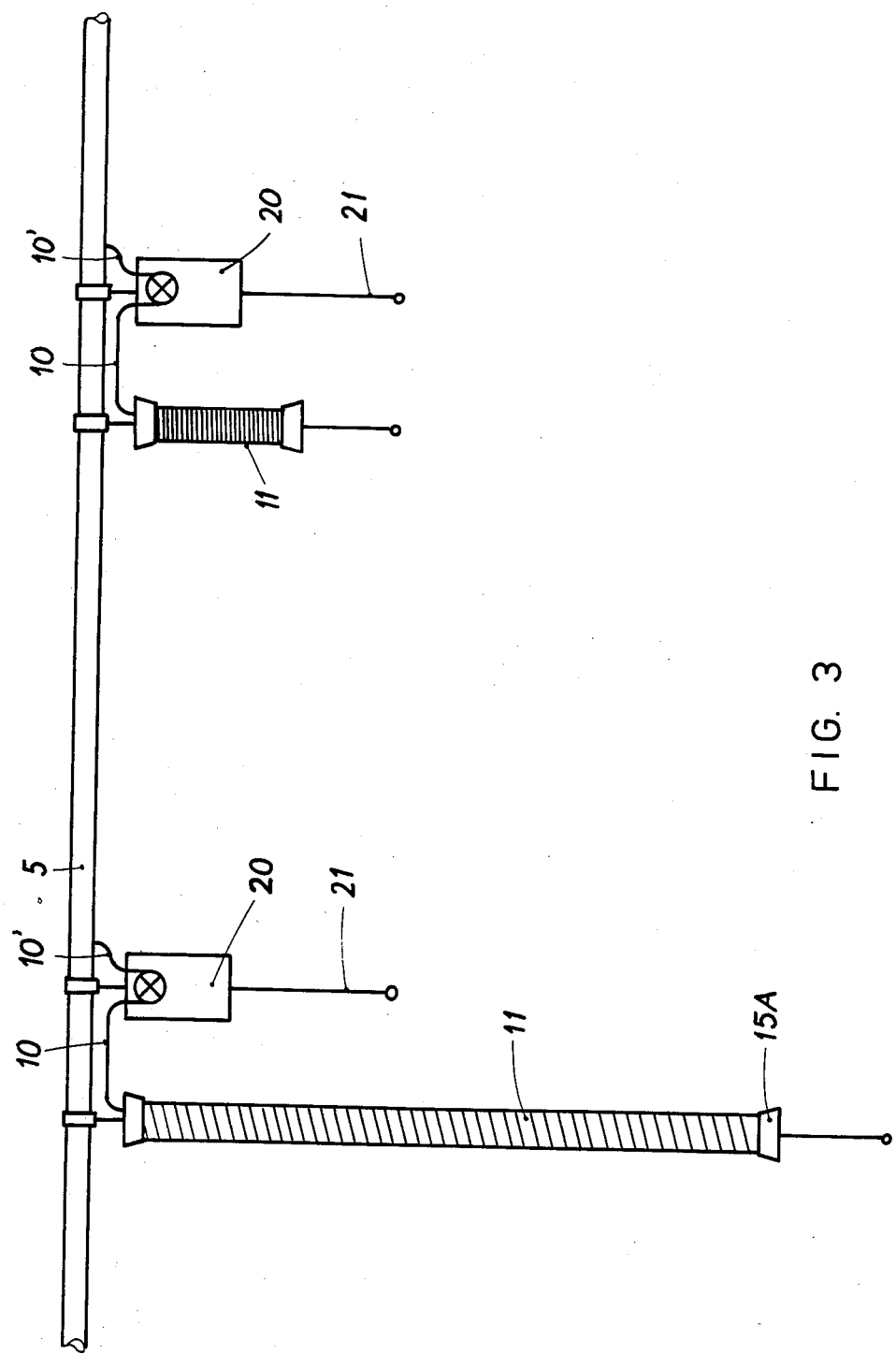
FIG. 3 is a side elevational view showing in its left part the lifting element in extended condition and in the right part in contracted condition, together with the electronical assembly and connected to the vacuum conduit of a milking machine.

FIG. 3, the electronic valve assembly, is provided in a separate housing 20 suspended from the vacuum conduit 5. However, this housing 20 may also be provided on top of the upper end cap 15 of the lifting apparatus 11. The vacuum hose 10 extends from the fitting 16 (FIG. 2) to the housing 20 and is connected there with to the vacuum valve V, from which another connecting line is connected to the vacuum conduit 5 through a short hose 10′. A starting switch (not shown) mounted in the housing 20 is actuated by the cord 21, to place the milking process in operation. Using a three-way vacuum valve, the valve V initially closes the communication between the bellows 12 and the vacuum conduit 5 and simultaneously exposes the interior of the bellows 12 into communication with the ambient air. Should a two-way valve be employed, the valve V only closes communication with the vacuum line requiring the ambient air communication to be established in some other way as by pulling a cord (not shown) connected to the lower end of the bellows 12, to open an air valve provided at that position as aforementioned. Due to the ambient air supply within the bellows 12, the bellows can assume its largest length according to FIG. 3 simply by the user pulling on the milking cluster 8 to connect it to the cow's udder.

When a so-called milk flow indicator issues a signal that the milk quantity contained in the cow has been exhausted and the milking process is terminated, the vacuum valve is operated such that it permits bellows 12 to communicate through the conduits 10 and 10′, with the vacuum conduit 5 permitting the bellows to retract to the position indicated in FIG. 3, to the right.

It will be clear that the lifting element 11 need not be a cylindrical bellows. It may also have, instead of the coil spring, separate metallic or plastic rings, e.g. such rings which concentrically fit one within the other when the bellows retracts, and which are contained within a thin elastic outer covering, corresponding to that discussed above. The covering are, in the case of the concentric rings, somewhat cone-shaped. It is also possible to form the lifting element 11 of several tubular portions which are telescopically mutually connected, however, in this case the several tube portions have to be completely mutually sealed.

It is further noted that in the prior removal apparatus the connection between the lifting cylinder and the lifting cord may give way without damange if the cow puts its leg on this cord, by mutually connecting the cord and the milking cluster through a resilient clamp. However, unlike the embodiment of the present invention where the plug 18 according to FIG. 2 may be dislodged opening the bellows 12 to atmosphere, the vacuum in the prior art still causes lifting of the lifting cord.

FIG. 4 shows a magnetic step-on-protection device comprising magnetic housing 22 secured in the lower end cap 15A of the hose 12 by an end pin provided with screw thread, and a nut. A plate shaped permanent magnet 23 is received in magnetic housing 22 and is contained in the plane of the exposed lower side of the magnet 23. A soft iron plate 24 engages the magnet 23, the soft iron plate 24 being secured in a protective cap 25 slightly deeper than the plate 24 so as to prevent damage to the plate when it falls on the floor, as well as contact of the plate with dirt. The cap 25 fits over the magnetic housing 22 and by this feature and the flush edge of the magnet housing, the adhesion force of the magnet is not reduced by intervening dirt or burrs. The maximum adhesion force is selected or adjusted to a valve so that a selected pulling force on the cord is obtained whereby no damage of the hose can occur.

Figure 4B:
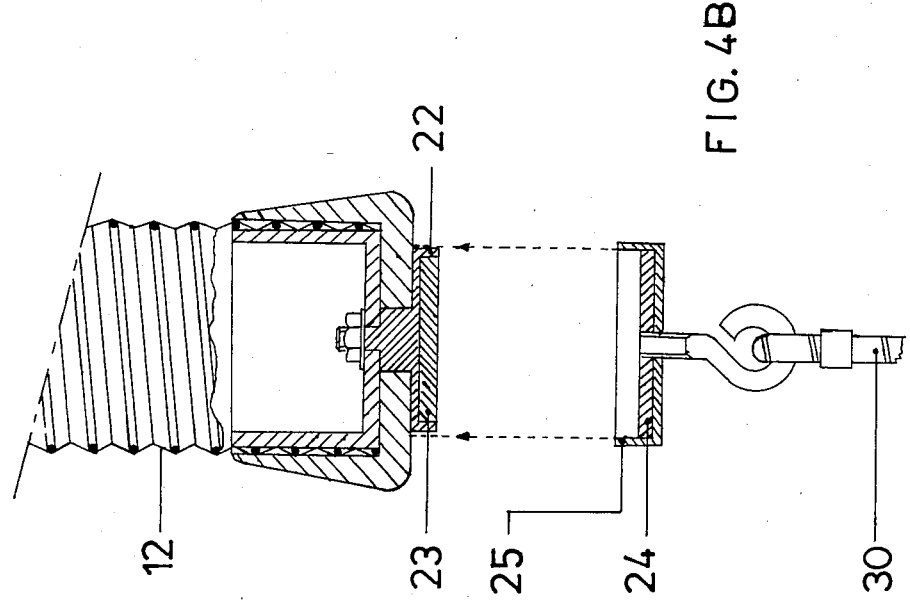
FIGS. 4a and 4b are partial longitudinal sections of the lifting element, provided with a magnetic stepping-on-protection, in the normally connected and stepped-on condition of the lifting-cord.
Figure 4A:
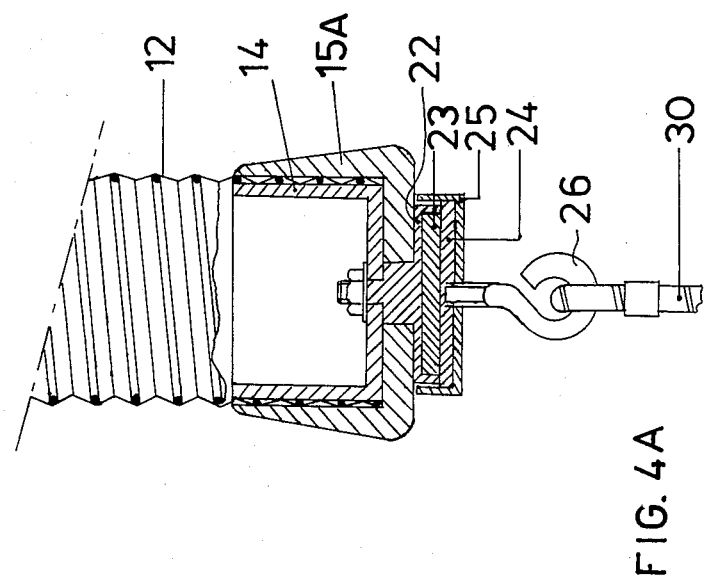

FIG. 4a shows the position in which the lifting cord 30 is connected with the hose and FIG. 4b shows the condition in which the lifting cord has been pulled free from the hose.

As indicated, the vacuum valve may be a three-way valve, but also a two-way valve if a small air valve (not shown) has been provided to the lower end of the lifting element, actuatable by a separate cord. This construction is cheaper and, moreover, the lifting bellows may then be moved to its extended condition by pulling this cord, whereby the bellows may be drawn in the direction towards the cow.

It will be clear that the novel removal apparatus may also be used in other stables than the mentioned cowsheds.

What is claimed is:

1. Apparatus for supporting a vacuum operable milking cluster adapted to be detachedly applied to the udder of an animal, comprising an elongated flexible and longitudinally elastic and air-tight hollow member connected at one end to a standard above the animal and at its other end to the milking cluster, said member being longitudinally expansible in response to the presence of air therein to permit said milking cluster to be applied to the udder of said animal and contractible in response to the removal of air to cause said hollow member to lift said milking cluster from said udder.

2. The apparatus according to claim 1 including a source of vacuum connected to a valve for selectively connecting said hollow member with said source of vacuum and an electric control circuit for bringing the hollow member under the influence of the vacuum cluster automatically in response to the completion or interruption of the milking of said animal.

3. The apparatus according to claim 2 wherein the valve is a two-way valve, and a manually operated air supply valve is provided at the lower end of the hollow member.

4. The apparatus according to claim 1 wherein the hollow member comprises an elongated hose formed of textile material and coated with a natural or synthetic elastic material.

5. The apparatus according to claim 4 wherein said hose is formed as an elongated bellows.

6. The apparatus according to claim 5 wherein said hose is reinforced by rigid ring members located between each pair of successive undulations of the bellows.

7. The apparatus according to claim 6 wherein said rings are metallic.

8. The apparatus according to claim 5 wherein said hose is reinforced by a coil spring extending along the length of the bellows.

9. The apparatus according to claim 1 wherein the hollow member is connected to the milking cluster by means of a resilient plug and cord, said plug being retractably inserted into a central apeture in the bottom of the hollow member.

10. The apparatus according to claim 1 wherein the milking cluster is connected to the hollow member by means of a soft iron plate and a permanent magnet plate, one of said plates being connected to the milking cluster and the other being secured to the lower end of the hollow member.

* * * * *